United States Patent
Park et al.

(10) Patent No.: US 9,543,555 B2
(45) Date of Patent: Jan. 10, 2017

(54) BATTERY MODULE

(75) Inventors: Seong-Joon Park, Yongin-si (KR); Ri-A Ju, Yongin-si (KR); Suk-Kyum Kim, Yongin-si (KR); Hyun Kim, Yongin-si (KR); Ji-Hong Lim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 270 days.

(21) Appl. No.: 13/593,236

(22) Filed: Aug. 23, 2012

(65) Prior Publication Data
US 2013/0252047 A1   Sep. 26, 2013

(30) Foreign Application Priority Data
Mar. 23, 2012  (KR) ................ 10-2012-0030234

(51) Int. Cl.
*H01M 2/06* (2006.01)
*H01M 2/10* (2006.01)
*H01M 2/20* (2006.01)
*H01M 10/48* (2006.01)

(52) U.S. Cl.
CPC ........... *H01M 2/1077* (2013.01); *H01M 2/206* (2013.01); *H01M 10/48* (2013.01)

(58) Field of Classification Search
CPC ..... H01M 2/1077; H01M 2/206; H01M 10/48
See application file for complete search history.

(56) References Cited

U.S. PATENT DOCUMENTS

| 6,240,637 | B1 | 6/2001 | Ikeda et al. |
| 2002/0098734 | A1 | 7/2002 | Ikeda |
| 2010/0055993 | A1 | 3/2010 | Ikeda |
| 2011/0104521 | A1 | 5/2011 | Kishimoto et al. |

FOREIGN PATENT DOCUMENTS

| JP | 11-120986 A | 4/1999 |
| JP | 2000-123802 A | 4/2000 |
| JP | 2006-120487 A | 5/2006 |
| JP | 2008-186725 A | 8/2008 |
| JP | 2009-059663 A | 3/2009 |
| JP | 2010-055885 A | 3/2010 |
| JP | 2011-119240 A | 6/2011 |

(Continued)

OTHER PUBLICATIONS

Korean Office Action dated Apr. 11, 2013 for Korean Patent Application No. KR 10-2012-0030234 which corresponds to captioned U.S. Appl. No. 13/593,236.

(Continued)

*Primary Examiner* — Helen O Conley
(74) *Attorney, Agent, or Firm* — Knobbe Martens Olson & Bear LLP

(57) ABSTRACT

A battery module including a plurality of unit cells, a plurality of bus bars electrically connecting the plurality of unit cells, a positive electrode terminal and a negative electrode terminal that are electrically connected and in contact with two ends of the plurality of unit cells, a battery housing accommodating the plurality of unit cells and the bus bars, and detection terminals that are respectively electrically connected to the plurality of bus bars, wherein the detection terminals are exposed outside the battery housing. Accordingly, voltage balancing between the unit cells may be controlled without disassembling the battery module.

10 Claims, 5 Drawing Sheets

(56) References Cited

FOREIGN PATENT DOCUMENTS

KR        2011-011290 A     10/2011

OTHER PUBLICATIONS

Office Action dated Aug. 6, 2013 for corresponding KR Application No. 10-2012-0030234.
Office Action dated Mar. 4, 2016 in Chinese Application No. 20120468661.8.
Office Action issued on Sep. 2, 2016 for Chinese Patent Application No. 201210468661.8.

BATTERY MODULE

RELATED APPLICATIONS

This application claims the benefit of Korean Patent Application No. 10-2012-0030234, filed on Mar. 23, 2012, in the Korean Intellectual Property Office, the disclosure of which is incorporated herein in its entirety by reference.

BACKGROUND

Field

One or more embodiments of the present invention relate to a battery module.

Description of the Related Art

Unlike primary batteries, secondary batteries may be charged and discharged. Second batteries are used in the form of single batteries or in the form of a unit cell module by connecting a plurality of batteries in a single unit according to the type of applied external device that is to be used with the unit.

A unit cell module has a structure in which a plurality of cells are combined, and thus safety and operational efficiency of the unit cell module may be lowered when the voltage balance between the cells is not maintained due to overvoltage of some of the cells. Thus, a means or mechanism for detecting and controlling voltage balancing between cells is necessary, and such devices or the like are generally included inside a unit battery module to maintain voltage balancing between cells.

However, when such devices are included in a unit battery module fail, the cell module may have to be disassembled to control voltage balancing of each cell. Therefore, taking appropriate action in emergency situations may be difficult.

SUMMARY

One or more embodiments of the present invention include a battery module for controlling voltage balancing between unit cells in the battery module without disassembling the battery module.

Additional aspects will be set forth in part in the description which follows and, in part, will be apparent from the description, or may be learned by practice of the presented embodiments.

According to one or more embodiments of the present invention, a battery module includes a plurality of unit cells, a plurality of bus bars that electrically connect the plurality of unit cells, a positive electrode terminal and a negative electrode terminal that are electrically connected and in contact with two ends of the plurality of unit cells, a battery housing accommodating the plurality of unit cells and the plurality of bus bars, and detection terminals that are each electrically connected to the plurality of bus bars, wherein the detection terminals are exposed outside the battery housing.

Also, the positive electrode terminal and the negative electrode terminal are exposed outside the battery housing, and a voltage of a unit cell or unit cells among the plurality of unit cells disposed between two randomly selected terminals from among the positive electrode terminal, the negative electrode terminal, and the detection terminals is measurable via the two random terminals.

Here, charge or discharge of the unit cell or the unit cells disposed between the two randomly selected terminals may be performed via the two randomly selected terminals.

Also, the plurality of unit cells may form at least one unit cell modules by connecting parallel to each other.

Also, the detection terminals may each be connected to bus bars having potentials different from one another among the plurality of bus bars.

Also, the battery housing includes a case having an opening formed thereon, and a cover portion that covers the opening, wherein the detection terminals are exposed outside by penetrating the cover portion.

Also, each of the detection terminals includes a support portion contacting an upper surface and a lower surface of the cover portion.

In another embodiment, the invention comprises a battery module comprising a plurality of battery cells that are connected together to define a plurality of nodes between selected ones of the plurality of battery cells including a first end node and a second end node; a positive and negative electrode terminals that are electrically connected and in contact with the first end node and a second end node respectively; and a battery housing that receives the plurality of units cells. In this aspect the battery module also comprises a plurality of terminals including a positive terminal and a negative terminal that are coupled to the first and second end nodes and at least one detection terminal coupled to at least one of the nodes of the plurality of batteries wherein the positive and negative electrode terminals and the at least one detection terminal extend outwards of the battery housing and wherein an electrical characteristic of the battery cells located between a selected set of the terminals that includes at least one detection terminal is measurable outside of the battery housing.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
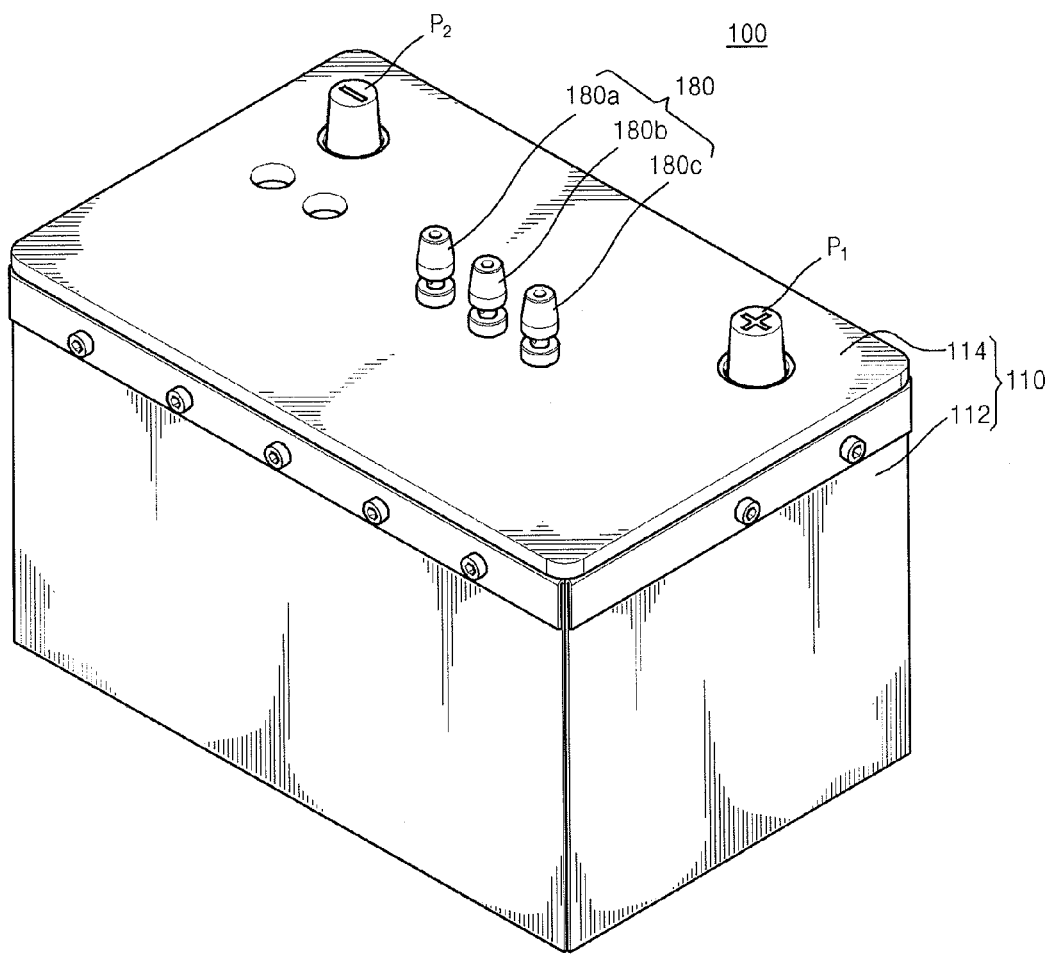
FIG. 1 is a perspective view of a battery module according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" or "under" another element, the element can be "directly" or "indirectly" formed on or under another element, and a standard of an element to be formed on or under is described with reference to the figures. Also, each element is exaggerated, omitted, or schematically described for ease of description and clarity.

Figure 2:
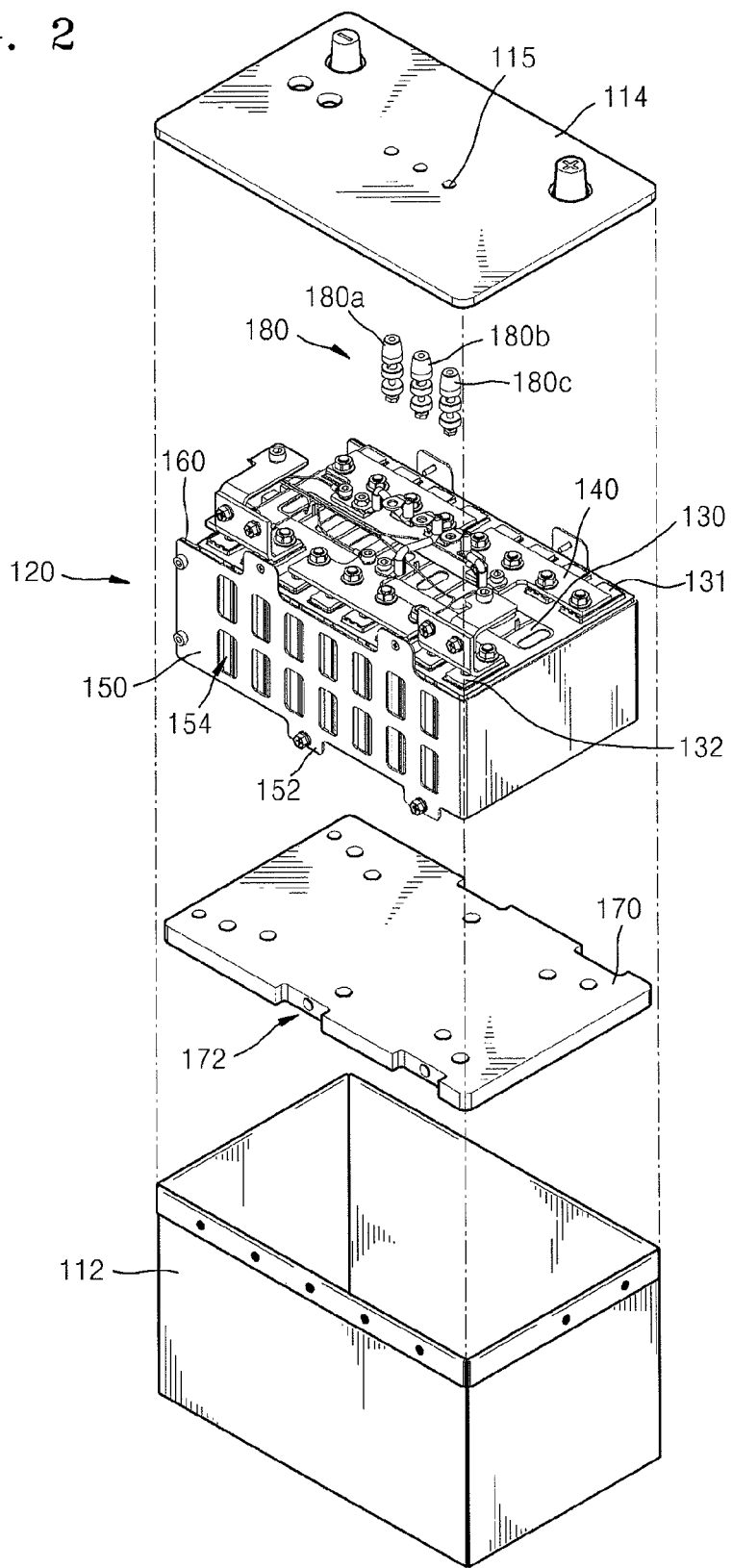
FIG. 2 is a perspective view of the battery module of FIG. 1 in a disassembled state.
Figure 3:
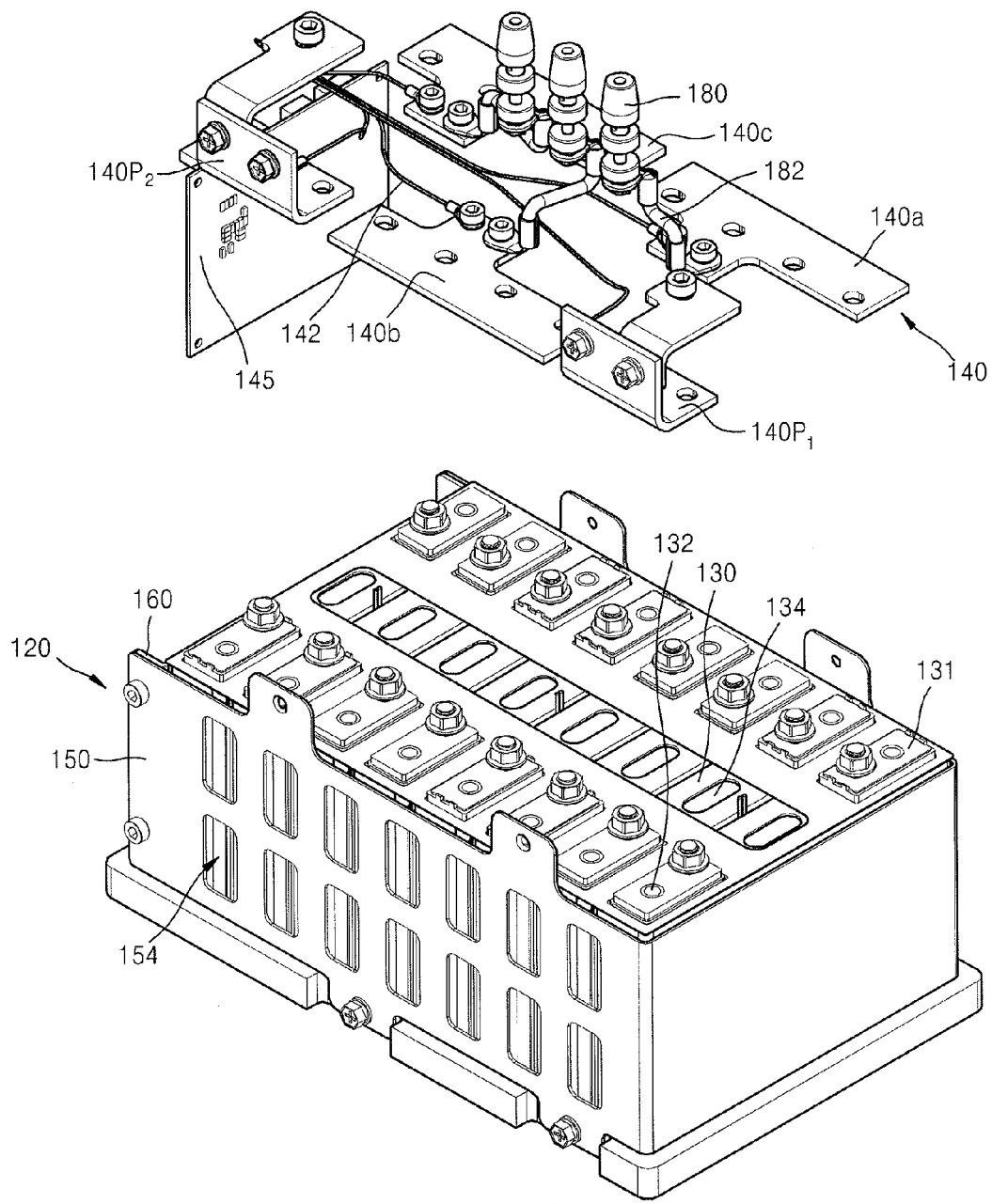
FIG. 3 is a perspective view of a battery portion of the battery module of FIG. 1.
Figure 4:
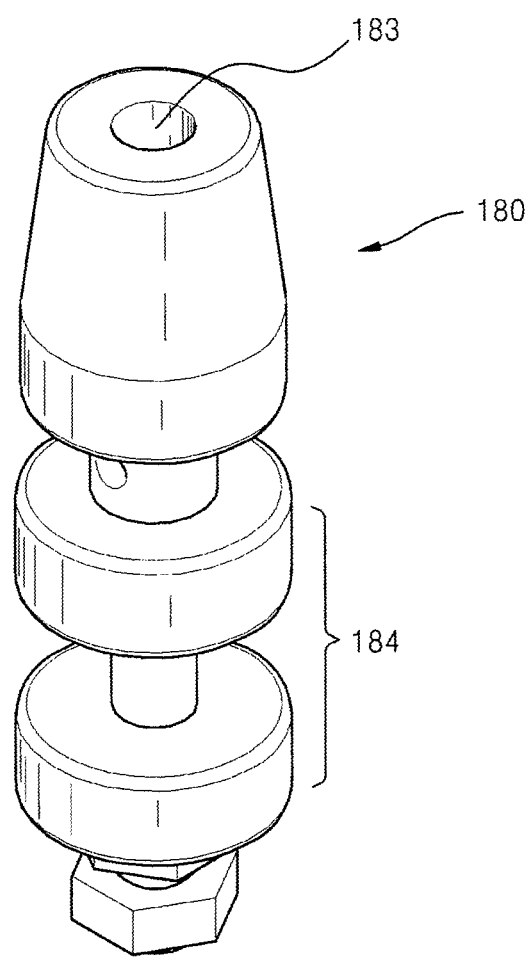
FIG. 4 is a perspective view of a detection terminal of the battery module of FIG. 1.

FIG. 1 is a perspective view of a battery module according to an embodiment of the present invention, FIG. 2 is a perspective view of the battery module of FIG. 1 in a disassembled state, and FIG. 3 is a perspective view of a battery portion of the battery module of FIG. 1. Also, FIG. 4 is a perspective view of a detection terminal of the battery module of FIG. 1.

Referring to FIGS. 1 through 3, a battery module 100 according to an embodiment of the present invention may include a battery portion 120 that performs charging and discharging operations, and a battery housing 110 that accommodates the battery portion 120 and forms an exterior of the battery module 100. Also, the battery module 100 may include bus bars 140 that electrically connect a plurality of unit cells 130, and detection terminals 180 that are electrically connected to the bus bars 140 and exposed outside of the battery housing 110.

First, referring to FIGS. 2 and 3, the battery portion 120 is described in detail. The battery portion 120 may include the unit cells 130 arranged in a column, the bus bars 140 electrically connecting the unit cells 130, a restrainer 150 disposed surrounding the unit cells 130 arranged in a column, and an end plate 160 bound to the restrainer 150.

The unit cells 130 may be prepared with secondary batteries such as lithium ion batteries and may be prepared in a nearly rectangular form. Each of the unit cells 130 may include a first electrode 131 and a second electrode 132. The first electrode 131 and the second electrode 132 may output electricity stored inside each of the unit cells 130 or receive electricity supplied from outside, via electrical connections. Also, a vent element 134 for releasing gas generated in the unit cells 130 outside may be installed on top of each of the unit cells 130.

Meanwhile, although not shown in the drawings, an electrode assembly (not shown) may include a first electrode plate, a second electrode plate, and a separator interposed between the first and second electrodes plates as power generation elements inside each of the unit cells 130. The electrode assembly may be formed by interposing the separator between the first electrode plate, which is a positive electrode plate, and the second electrode plate, which is a negative electrode plate, and winding the resultant in the form of a roll. The first electrode 131 is electrically connected to the first electrode plate, and the second electrode 132 is electrically connected to the second electrode plate, and thus charge and discharge of the electrode assembly is performed through the first and second electrodes 131 and 132.

The unit cells 130 may be arranged in parallel following a thickness direction of the unit cells 130 and may be electrically connected to one another through the bus bars 140. Meanwhile, a spacer (not shown) may be disposed between every two of the unit cells 130 arranged in a column. The spacer (not shown) may maintain intervals between the unit cells 130 to support side walls of the unit cells 130 and to let air flow in and out therebetween by being disposed between the unit cells 130.

The bus bars 140 are for serial connection of the unit cells 130 and are each an element connecting the first electrode 131 of one unit cell 130 and the second electrode 132 of a neighboring unit cell 130. Thus, according to an embodiment of the present invention, two connection portions 140P1 and 140P2 that are placed at two ends of the battery portion 120 and respectively connected to a positive electrode terminal P1 and a negative electrode terminal P2 are described as elements different from the bus bars 140.

Each of the bus bars 140 may electrically connect the first electrode 131 and the second electrode 132 of the unit cells 130 by being extended across the top of the unit cells 130 in a direction in which the unit cells 130 are arranged. Here, the unit cells 130 may be arranged in a horizontally alternating pattern. Accordingly, the unit cells 130 may be connected in series through the bus bars 140 extended in one direction.

Meanwhile, electrical connections formed by the bus bars 140 between the unit cells 130 may be a combination of parallel connections and serial connections or a combination of serial connections only. The bus bars 140 thus act as nodes that interconnect adjacent batteries and the two connection portions 140P1 and 140P2 can be considered end nodes.

The plurality of unit cells 130 may form at least one unit cell modules by connecting in parallel to each other.

Figure 5:
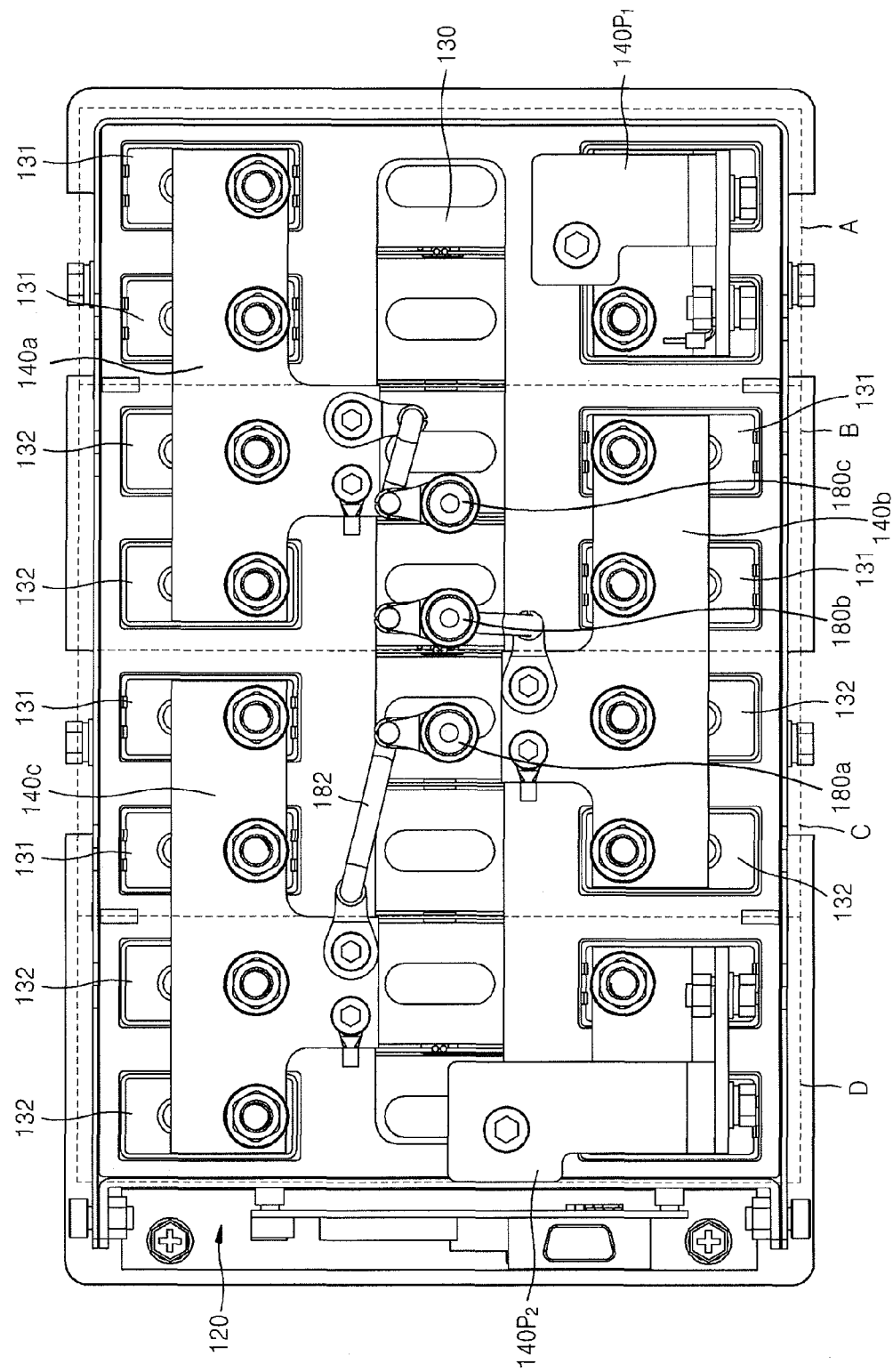
FIG. 5 is a plan view of the battery module of FIG. 1 without a cover portion.

For example, as shown in the drawings, neighboring unit cells 130 may form a plurality of unit cell modules A through D of FIG. 5 by being connected in parallel to each other. Also, the unit cell modules A through D of FIG. 5 may be connected in series to each other by the bus bars 140, and thus a voltage of the battery portion 120 may be adjusted to a desired level. Here, the unit cell modules A through D of FIG. 5 may be connected by one or more bus bars 140.

Further, the unit cell modules A through D of FIG. 5 hereinafter include one or more unit cells 130. Thus, when one unit cell 130 is included in each of the unit cell modules A through D of FIG. 5, the unit cell modules A through D of FIG. 5 are the same as the unit cells 130, and thus both the unit cell modules A through D of FIG. 5 and the unit cells 130 may be used compatibly.

One ends of voltage detection wires 142 may be attached to each of the bus bars 140 and the two connection portions 140P1 and 140P2. Other ends of the voltage detection wires 142 are connected to a BMS circuit substrate 145, and accordingly voltage balancing of the unit cells 130 may be automatically controlled.

The restrainer 150 is formed to surround one end wall of the unit cells 130 in the direction in which the unit cells 130 are arranged in a column, and two side walls of the unit cells 130. Also, the end plate 160 is placed at another end wall of the unit cells 130 in the direction in which the unit cells 130 are arranged in a column. The end plate 160 may be bound to the restrainer 150. Thus, 4 walls of one column in which the unit cells 130 are arranged may be surrounded by the restrainer 150 and the end plate 160, and thus expansion of the unit cells 130 may be effectively suppressed.

Particularly, the restrainer 150 may be formed as a rectangular frame with one side opened and may surround side walls of the unit cells 130 and one end wall of the unit cells 130. Also, the restrainer 150 may include an engagement portion 152 on one wall of the restrainer 150 that is formed protruding downwardly. Also, a plurality of cooling holes 154 may be formed on both of two side walls of the restrainer 150. The cooling holes 154 are formed on locations corresponding to the spacers (not shown), thereby allowing air to flow in the spacers from outside.

The battery housing 110 may include a case 112 that accommodates the battery portion 120, and a cover portion 114.

A base frame 170 may be located on a lower surface of the case 112. The base frame 170 may include a position arrangement portion 172 that supports the battery portion 120 and defines a position at which to assemble the battery portion 120. The position arrangement portion 172 may be formed in the form of a recess, and the engagement portion 152 of the restrainer 150 may be bound to the position arrangement portion 172.

Moreover, the base frame 170 may also function as a heat insulating board for releasing heat generated by charge and discharge operations of the unit cells 130.

The cover portion 114 forms a sealed space for the battery portion 120 by covering an opening on an upper surface of the case 112 accommodating the battery portion 120.

The positive electrode terminal P1 and the negative electrode terminal P2 for forming electrical contacts with external peripheral devices may be formed on the cover portion 114. The positive electrode terminal P1 and the negative electrode terminal P2 may be formed to penetrate the cover portion 114. Also, the positive electrode terminal P1 and the negative electrode terminal P2 are respectively electrically connected to the two connection portions 140P1 and 140P2 attached at the two ends of the plurality of unit cells 130 connected in series or at the two ends of the plurality of unit cell modules A through D of FIG. 5.

Meanwhile, the detection terminals 180 may be disposed on the battery portion 120. The detection terminals 180 may be formed as a plurality, electrically connected with the bus bars 140, and exposed outside through the battery housing 110, more particularly, through via holes 115 formed on the cover portion 114.

The detection terminals 180 are respectively electrically connected to the bus bars 140 through cables 182. For example, as shown in the drawings, three of the detection terminals 180 are respectively connected to the bus bars 140a to 140c with potentials different from one another among the bus bars 140. Accordingly, a plurality of terminals each at equipotential with one of the bus bars 140 may be exposed outside the battery housing 110.

Further, the positive electrode terminal P1 and the negative electrode terminal P2 are connected to the two connection portions 140P1 and 140P2 located at the two ends of the battery portion 120. Also, the positive electrode terminal P1 and the negative electrode terminal P2 are exposed outside the battery housing 110. Thus, the potentials of two terminals randomly chosen among the positive electrode terminal P1, the negative electrode terminal P2, and the detection terminals 180 can be measured without disassembling the battery module 100, and a voltage between the unit cells 130 disposed between the two randomly chosen terminals may also be measured.

Also, charge or discharge of the unit cells 130 disposed between the two random terminals may be performed via the two randomly chosen terminals, and thus voltage balancing among the unit cells 130 may be controlled without disassembling the battery module 100. This will be described with reference to FIG. 5.

Further, FIG. 4 is a perspective view of one form of the detection terminals 180. Referring to FIG. 4, the detection terminals 180 may include an insertion portion 183 for electrically contacting external peripheral devices and support portions 184 for immobilizing positions of the detection terminals 180. The support portions 184 may be vertically separated by a distance corresponding to a thickness of the cover portion 114 to enable the support portions 184 to contact an upper surface and a lower surface of the cover portion 114. Also, the support portions 184 may include two protruding portions that protrude in a direction perpendicular to a direction of the thickness of the cover portion 114. Moreover, a wiring terminal of an O-ring for contacting the cables 182 may be combined with a lower portion of the detection terminals 180.

FIG. 5 is a plan view of the battery module 100 of FIG. 1 without the cover portion 110.

FIG. 5 illustrates eight of the unit cells 130. The unit cells 130 are paired and connected in parallel to form four unit cell modules A to D. The four unit cell modules A to D are connected in series by the three bus bars 140a to 140c forming the battery portion 120. Also, the two connection portions 140P1 and 140P2 are formed at the two ends of the battery portion 120, and the positive electrode terminal P1 and the negative electrode terminal P2 are connected to the two connection portions 140P1 and 140P2 forming electrical contacts with external peripheral devices. However, an embodiment of the present invention is not limited to a structure illustrated in FIG. 5 and may have a variety of structures.

Referring to FIG. 5, the four unit cell modules A to D may be arranged in a horizontally alternating pattern. Accordingly, a first bus bar 140a may be extended across first electrodes 131 of a first unit cell module A and across second electrodes 132 of a second unit cell module B, a second bus bar 140b may be extended across first electrodes 131 of the second unit cell module B and across second electrodes 132 of a third unit cell module C, and a third bus bar 140c may be extended across first electrodes 131 of the third unit cell module C and across second electrodes 132 of a fourth unit cell module D.

For example, the second bus bar 140b may connect the first electrodes 131 of the second unit cell module B to each other and the second electrodes 132 of the third unit cell module C to each other in parallel and may connect the second unit cell module B and the third unit cell module C in series at the same time.

Also, the three detection terminals 180a to 180c are respectively electrically connected to the three bus bars 140a to 140c through the cables 182 and thus may measure a voltage of each of the unit cell modules A to D or may be used for directly supplying power charge to each of the unit cell modules A to D by being connected with an external charger.

For example, as shown in FIG. 5, a first detection terminal 180a is connected to the third bus bar 140c through one of the cables 182, a second detection terminal 180b is connected to the second bus bar 140b through another of the cables 182, and a third detection terminal 180c is connected to the first bus bar 140a through another of the cables 182. That is, the three detection terminals 180a to 180c are respectively connected to the three bus bars 140a to 140c having potentials different from one another.

As described above, the three detection terminals 180a to 180c are exposed outside, and the positive electrode terminal P1 and the negative electrode terminal P2 connected to the two connection portions 140P1 and 140P2 are also exposed to the outside, and thus potentials of the four unit cell modules A to D may be measured from outside.

Therefore, if a potential difference of two random terminals among the positive electrode terminal P1, the negative electrode terminal P2, and the three detection terminals 180a to 180c is measured, a voltage between the unit cells 130 disposed between the two randomly chosen terminals may be measured. Also, charge or discharge of the unit cells 130 disposed between the two random terminals may be performed via the two randomly chosen terminals.

For example, if the first detection terminal 180a and the second detection terminal 180b are selected, a voltage of the third unit cell module C is measured, and charge or discharge of the third unit cell module C may be performed accordingly. Similarly, if the first detection terminal 180a and the third detection terminal 180c are selected, voltages of the second unit cell module B and the third unit cell module C are measured, and charge or discharge of the second unit cell module B and the third unit cell module C may be preformed accordingly.

Therefore, voltage balancing between the unit cells 130 may be controlled by measuring voltages between the unit cells 130 and performing charge or discharge accordingly without disassembling the battery module 100.

While a battery module according to embodiments of the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A battery module comprising:
   a plurality of unit cells each having a top surface that defines a plane, a bottom surface and a side surfaces;
   a plurality of bus bars that electrically connect the plurality of unit cells and extend over the top surfaces of the plurality of unit cells;
   a positive electrode terminal and a negative electrode terminal that are electrically connected and in contact with two ends of the plurality of unit cells wherein the positive electrode terminal and the negative electrode terminal of each of the plurality of unit cells extend outward from the top surface of the plurality of unit cells;
   a battery housing accommodating the plurality of unit cells and the plurality of bus bars; and
   detection terminals that are each electrically connected to the plurality of bus bars,
   wherein the detection terminals comprise elongate members that extends in a direction perpendicular outward to and upward from the plane of the top surface of the plurality of unit cells when the bottom surface of the plurality of unit cells are positioned on a bottom surface of the battery housing which is positioned on a flat surface and have a first end that contacts the bus bar and a second end spaced from the first end so as to be exposed outside the battery housing, wherein the battery housing comprises a case having an opening formed thereon, and a cover portion that covers the opening wherein the cover portion is planar and is positioned over the top surfaces of the plurality of unit cells so as to cover the top surfaces of the plurality of unit cells, wherein the detection terminals extend outward from the top surfaces of the plurality of unit cells and through the cover portion to be exposed outside by penetrating the cover portion and wherein the detection terminals include an insertion portion that is positioned outside of the cover, a support portion that contacts both an inner and an outer wall of the cover portion of the housing.

2. The battery module of claim 1, wherein the positive electrode terminal and the negative electrode terminal are exposed outside the battery housing, and a voltage of a unit cell or unit cells among the plurality of unit cells disposed between two selected terminals from among the positive electrode terminal, the negative electrode terminal, and the detection terminals is measurable via the selected terminals.

3. The battery module of claim 2, wherein charge or discharge of the unit cell or the unit cells disposed between the two selected terminals is performed via the two randomly selected terminals.

4. The battery module of claim 1, wherein the plurality of unit cells form at least one unit cell modules by connecting at least some of the plurality of cells in parallel to each other.

5. The battery module of claim 1, wherein the detection terminals are each connected to bus bars having potentials different from one another among the plurality of bus bars.

6. A battery module comprising:
   a plurality of battery cells having top and bottom surfaces and a plurality of side surfaces that are connected together to define a plurality of nodes between selected ones of the plurality of battery cells including a first end node and a second end node wherein the top surface of the plurality of battery cells define a plane;
   a positive and negative electrode terminals that are electrically connected and in contact with the first end node and a second end node respectively wherein the positive electrode terminal and the negative electrode terminal of each of the plurality of unit cells extend out of the top surface of the plurality of unit cells;
   a battery housing that receives the plurality of units cells;
   a plurality of terminals including a positive terminal and a negative terminal that are coupled to the first and second end nodes and at least one detection terminal coupled to at least one of the nodes of the plurality of batteries wherein the positive and negative electrode terminals and the at least one detection terminal extend outwards and upward of the battery housing when the bottom surface of the plurality of unit cells are positioned on a bottom surface of the battery housing which is positioned on a flat surface and wherein an electrical characteristic of the battery cells located between a selected set of the terminals that includes at least one detection terminal is measurable outside of the battery housing wherein the at least one detection terminal is elongate and includes a first end that is connected to a bus bar attached to at least one of the plurality of battery cells the at least one detection terminal extends in a direction perpendicularly outward from the plane of top the surfaces of the plurality of unit cells to a second end that spaced from the first end so as to extend outward of the battery housing wherein the battery housing comprises a case having an opening formed thereon, and a cover portion that covers the opening wherein the cover portion is planar and is positioned over the top surfaces of the plurality of unit cells, wherein the detection terminals extend outward from the top surfaces of the case and through the cover portion to be exposed outside the case by penetrating the cover portion and wherein the detection terminals include an insertion portion that is positioned outside of the cover, a support portion that contacts both an inner and an outer wall of the cover portion of the housing.

7. The battery module of claim 6, wherein the at least one detection terminal comprises a plurality of detection terminals.

8. The battery module of claim 7, wherein the unit cell or unit cells disposed between the two selected terminals are chargeable via the two selected terminals.

9. The battery module of claim 7, wherein the plurality of battery cells are interconnected by a plurality of bus bars and the plurality of detection terminals are respectively coupled to the plurality of bus bars.

10. The battery module of claim 9, wherein the plurality of bus bars and the plurality of cells are arranged so as to couple two sets of battery cells in parallel with each other between the first and second end nodes.

* * * * *